(12) United States Patent
Golabil

(10) Patent No.: US 9,338,526 B2
(45) Date of Patent: May 10, 2016

(54) ENHANCED UPDATING OF CONTROL MECHANISMS

(71) Applicant: Behrouz Golabil, Scottsdale, AZ (US)

(72) Inventor: Behrouz Golabil, Scottsdale, AZ (US)

( * ) Notice: Subject to any disclaimer, the term of this patent is extended or adjusted under 35 U.S.C. 154(b) by 590 days.

(21) Appl. No.: 13/986,136

(22) Filed: Apr. 4, 2013

(65) Prior Publication Data

US 2014/0300207 A1    Oct. 9, 2014

(51) Int. Cl.
*H04Q 3/00* (2006.01)

(52) U.S. Cl.
CPC ............... *H04Q 3/0008* (2013.01); *H04Q 3/00* (2013.01); *Y10T 307/74* (2015.04)

(58) Field of Classification Search
CPC ....... H04Q 3/0008; H04Q 3/00; Y10T 307/74
See application file for complete search history.

(56) References Cited

U.S. PATENT DOCUMENTS

| | | | | | |
|---|---|---|---|---|---|
| 4,829,779 | A | * | 5/1989 | Munson | F24F 11/0009 236/51 |
| 5,723,848 | A | * | 3/1998 | Bilenko | G05D 23/1932 219/483 |
| 6,011,329 | A | * | 1/2000 | McGovern | H02H 11/00 307/141.4 |
| 2005/0284987 | A1 | * | 12/2005 | Kande | B61L 29/16 246/125 |

* cited by examiner

*Primary Examiner* — Zeev V Kitov
(74) *Attorney, Agent, or Firm* — Mark Ogram

(57) ABSTRACT

The invention provides for an upgrading of equipment without the potential problems in replacing the existing system. A relay mechanism is interposed between the existing remote sensor and the existing controller, and between the existing controller and the existing remote operational mechanism. The relay mechanism permits the existing system to perform as before while allowing the signals from both the existing remote sensor and the existing controller to be monitored by a new and isolated replacement controller until such time that the existing controller is isolated allowing the replacement controller assumes operational duties. In this manner, the upgrading of the system is done without the costs of down time nor the potential for catastrophic results.

12 Claims, 2 Drawing Sheets

ENHANCED UPDATING OF CONTROL MECHANISMS

BACKGROUND OF THE INVENTION

This invention relates generally to control mechanisms and more particularly to systems for upgrading existing mechanism to more modern mechanisms.

Using the field of hydrocarbon refining as an example, there are hundreds of refineries which have been operating for decades. These refineries though have not been upgraded with the enhanced modern technology due to the costs associated with the upgrade. The preventive cost is not in the cost of the actual equipment, rather it includes the cost experienced when the refinery "goes down" while the upgrade is being installed (which often runs millions of dollars) as well as the risk associated with the upgrade itself should it not work properly and need to be debugged.

The risk of upgrading the technology is that the upgrade will not operate properly, will need adjustment to operate the refinery properly, or will affect another entire system not subject to the upgrade. In all of these situations, the refinery itself is inoperable which generates a very large loss of profit.

Further, a refinery that is taken off-line is not easily brought back on-line which causes even more problems.

Because of all of these reasons, operators of refineries are extremely reluctant to install more modern controllers, sensors, and remote operating mechanisms. This reluctance has a cascading affect as normal preventative maintenance is either postponed or totally eliminated; hence, when the existing systems break or fail, often replacement parts are difficult or typically impossible to obtain. The operators of the refineries are therefore on a fatal path where the question isn't if, but when, operationally critical equipment fails and cannot be replaced.

While this is particularly true for refineries, the same condition exists for a host of other systems such as sewage treatment plants, municipal water supplies, air-traffic control situations, and a host of others, well known to those of ordinary skill in the art.

It is clear that there is a significant need for a mechanism which permits a safe upgrade which eliminates or minimizes the risks of failure to the system.

SUMMARY OF THE INVENTION

The invention provides for an upgrading of equipment without creating potential problems in replacing the existing system. While the discussion relates to an evolving replacement of the existing hardware and software, the invention is not intended to be so limited and includes the completed mechanism, with all of the replacement parts.

Further, the present discussion relates generally to a refinery's upgrade, but, the invention is not intended to be so limited and those of ordinary skill in the art readily recognize that the invention is applicable to a host of other mechanisms.

The existing control system consists of an existing remote sensor which monitors a condition in the plant (e.g. the temperature of the oil), an existing controller, and an existing remote operational mechanism (e.g. a heating element). The existing controller monitors the data from the existing remote sensor and adjusts the existing remote operational mechanism so that the existing remote sensor reports a condition within a prescribed range.

As example, the existing sensor monitors the temperature of oil within the refining process. This oil is to be kept at a temperature within a defined range. As the temperature of the oils rises or falls, the existing controller adjusts the remove heater to assure the temperature remains within the prescribed range.

In the preferred embodiment for the evolution from the existing system to a new one, a repeater or relay is added between the existing controller and the existing remote sensor, and between the existing controller and the existing remote operational mechanism. While the preferred embodiment uses a single repeater/relay which handles both communication lines (remote sensor/controller and controller/operational mechanism), another embodiment uses two distinct repeaters.

Repeaters are well known in the art. Those of ordinary skill in the art readily appreciate a variety of repeaters which are applicable in this context, including, but not limited to: U.S. Pat. No. 8,135,336, entitled "Repeater and Follow-up Notification Method After Broadcast Communication Thereof" issued to Nawata on Mar. 13, 2012; incorporated hereinto by reference.

The preferred embodiment's second step or component is a replacement controller that is connected to the repeater to monitor the signals going to the existing controller and the signals going from the existing controller to the existing remote operational mechanism. It is important to note that even at this point, the existing system continues to work as it has without any interruption to the refinery. The short period of time that the installation of the repeater/relay requires is more than acceptable as the system is "off-line" for only a few minutes and easily adjusts after the system is put back on-line.

An added advantage to the system at this juncture in the evolution is the fact that the replacement controller is capable of interacting with a host of modern interfaces to communicate the signals being received from the existing remote sensor and the signals being communicated to the existing remote operational mechanism. This allows the use of large digital monitors to provide better visual communications and a feel of enhancement to the entire system; but, which is done in a totally safe environment.

The repeater/relay mechanism permits the existing system to perform as before while allowing the signals from both the existing remote sensor and the existing controller to be monitored by a new and isolated replacement controller until such time that the existing controller is isolated allows the replacement controller assumes operational duties.

A variety of controllers are well known to those of ordinary skill in the art. These include, but are not limited to: U.S. Pat. No. 8,140,836, entitled "Information Processing Apparatus and Program" issued to Ogawa et al. on Mar. 20, 2012; U.S. Pat. No. 8,140,202, entitled "Method of Controlling a Rail Transport system for Conveying Bulk Materials" issued to Dibble et al. on Mar. 20, 2012; incorporated hereinto by reference.

When the operators of the refinery are ready, the replacement controller is put "on-line" by isolating the existing controller from the existing remote operational mechanism. It is important to note that the existing system is still operating but not controlling the existing remote operational mechanism and can be instantly put back "on-line" should the replacement controller malfunction or fail in its duties.

Error monitoring is accomplished through techniques well known in the art, including, but not limited to those described in: U.S. Pat. No. 8,140,936, entitled "System for a Combined Error Correction Code and Cyclic Redundancy Check Code for a Memory Channel" issued to Gower et al. on Mar. 20, 2012; incorporated hereinto by reference.

Communications between the components is ideally done by the existing system although other forms of communication are well known to those of ordinary skill in the art, such as, but not limited to: U.S. Pat. No. 8,131,856, entitled "Communication System and Communication Method" issued to Murase et al. on Mar. 6, 2012; U.S. Pat. No. 8,121,673, entitled "Health Monitoring Appliance" issued to Tran on Feb. 21, 2012; U.S. Pat. No. 8,140,003, entitled "Method and Apparatus for Supporting Multi-Hop Communications in a Peer to Peer Communication System" issued to Laroia et al. on Mar. 20, 2012; U.S. Pat. No. 8,137,127, entitled "Electronic Devices using Divided Multi-Connector Element Differential Bus Connector" issued to Hunkins et al. on Mar. 20, 2012; U.S. Pat. No. 8,135,432, entitled "Method and System for Managing a Communication Link in a Communication Network" issued to Pinder et al. on Mar. 13, 2012; and, U.S. Pat. No. 8,140,746, entitled "Intelligent Memory Data Management" issued to Trichina et al. on Mar. 20, 2012; all of which are incorporated hereinto by reference.

Ideally, before the replacement controller is placed on-line and the existing controller is isolated, the signals being received and sent by the existing controller are stored in a memory. The memory apparatus chosen and the communications therewith are well known to those of ordinary skill in the art.

Those of ordinary skill in the art readily recognize a variety of component system which can be used in this context, including, but not limited to: U.S. Pat. No. 8,131,897, entitled "Semiconductor Memory Device Inputting and Outputting a Plurality of Data Length Formats and Method Thereof" issued to Kim et al. on Mar. 6, 2012; U.S. Pat. No. 8,131,827, entitled "PLC with Web-Accessible Program Development Software" issued to Batke et al. on Mar. 6, 2012; U.S. Pat. No. 8,131,396, entitled "Numerical Control Apparatus and Numerical Control System" issued to Yamada on Mar. 6, 2012; U.S. Pat. No. 8,130,672, entitled "Method of Multicasting and Transmitting Data in PLC Network and an Apparatus Thereof" issued to Lee et al. on Mar. 6, 2012; U.S. Pat. No. 8,031,758 entitled "Powerline Communication (PLC) Modem Employing an Analog Electromagnetic Transducer" issued to Dawson et al. on Oct. 4, 2011; and, U.S. Pat. No. 7,941,239, entitled "PLC" issued to Ikegami et al. on May 10, 2011; all of which are incorporated hereinto by reference.

This data within the memory permits the replacement controller to perform its own "programming" through rudimentary artificial intelligence. That is, a particular input from the existing remote sensor results in a particular response by the existing controller (and when placed "on-line", the replacement controller responds identically).

A variety of techniques are available for the artificial intelligence aspect of the present invention. Those of ordinary skill in the art readily recognize a variety of techniques, including those described in: U.S. Pat. No. 8,137,269, entitled "Method and System for Managing Physiological System" issued to Sheikhzadeh-Nadjar et al. on Mar. 20, 2012; U.S. Pat. No. 8,131,718, entitled "Intelligent Data Retrieval System" issued to Tran on Mar. 6, 2012; U.S. Pat. No. 8,131,401, entitled "Real-Time Stability Indexing for Intelligent Energy Monitoring and Management of Electrical Power Network System" issued to Nasle on Mar. 6, 2012; U.S. Pat. No. 8,140,898 entitled "Techniques for Gathering Evidence for Performing Diagnostics" issued to Beg et al. on Mar. 20, 2012; U.S. Pat. No. 8,140,533 entitled "Harvesting Relational Tables from Lists on the Web" issued to Elmeleegy et al. on Mar. 20, 2012; U.S. Pat. No. 8,140,458, entitled "Information Processing Apparatus, Information Processing Method, and Computer Program" issued to Sawada on Mar. 20, 2012; and, U.S. Pat. No. 8,140,448, entitled "System and Method for Classifying Data Streams with Very Large Cardinality" issued to Aggarwal et al. on Mar. 20, 2012; all of which are incorporated hereinto by reference.

This aspect of the invention is particularly powerful since the need for skilled programmers is all but eliminated through a self-teaching aspect of the replacement Controller. Further, this assures that the operation of the entire system is not disturbed when the replacement controller is used; the replacement controller behaves identically as the existing controller would.

Communications between the various components is well known to those of ordinary skill in the art as well as a variety of components. The invention utilizes a variety of components such as those described in: U.S. Pat. No. 8,132,071, entitled "Transmitting Device, Receiving Device, Packet Transmission Method, Packet Reception Method, and Programs for Same" issued to Hayashi on Mar. 6, 2012; U.S. Pat. No. 8,131,443, entitled "Acceleration Control System" issued to Inou et al. on Mar. 6, 2012; and, U.S. Pat. No. 8,131,153, entitled "Power Line Communication System Using Hybrid-Fiber Coaxial and Communication Device Used in the System" issued to Park et al. on Mar. 6, 2012; all of which are incorporated hereinto by reference.

Further in the evolution, another repeater/relay is interposed between the existing remote sensor and a replacement remote sensor when the need for a replacement sensor is warranted. As before, the use of the repeater/relay permits the existing remote sensor to operate until testing of the replacement remote sensor is sought; the existing remote sensor is simply isolated; and, should problems exist with the replacement remote sensor, the existing remote sensor is simply brought back on-line and the replacement sensor is isolated.

This "redundancy" approach of the present invention is highly useful as it permits the evolution without the danger of forcing the entire plant into a shutdown mode.

The use of repeaters/relays for redundancy is also applied to the existing remote operational mechanism where a repeater is placed between the existing remote operational mechanism and the controller (either the existing or the replacement controller). Again, the operational validity of a replacement remote operational mechanism is easily and safely checked by simply isolating the existing remote operational mechanism while the replacement remote operational mechanism is being "field tested".

In this manner, the upgrading of the system is done without the costs of down time nor the potential for catastrophic results.

Those of ordinary skill in the art readily recognize a variety of different applications for the present invention where existing control systems have been employed. Some of these are described in: U.S. Pat. No. 6,877,247, entitled "Power Saving Automatic Zoned Dryer Apparatus and Method" issued to DeMoore on Apr. 12, 2005; U.S. Pat. No. 6,689,417, entitled "Method for Coating and Drying" issued to Brandt, Jr. et al. on Feb. 10, 2004; U.S. Pat. No. 6,542,782, entitled "Systems for Generating and Using a Lookup Table with Process Facility Control Systems and Models of the Same, and Methods of Operating such Systems" issued to Lu on Apr. 1, 2003; U.S. Pat. No. 8,138,617, entitled "Apparatus and Method for Packaging Circuits" issued to Poo et al. on Mar. 20, 2012; and, U.S. Pat. No. 5,980,836, entitled "Apparatus for Preparing Low-Concentration Polyaluminosilicate Microgels" issued to Moffett et al. on Nov. 9, 1999; all of which are incorporated hereinto by reference.

The invention, together with various embodiments thereof will be more fully explained by the accompanying drawings and the following descriptions thereof.

DRAWINGS IN BRIEF

FIGS. 1A, 1B, and 1C illustrate in block form the invention being installed into an existing monitoring and control system.

DRAWINGS IN DETAIL

Figure 1A:
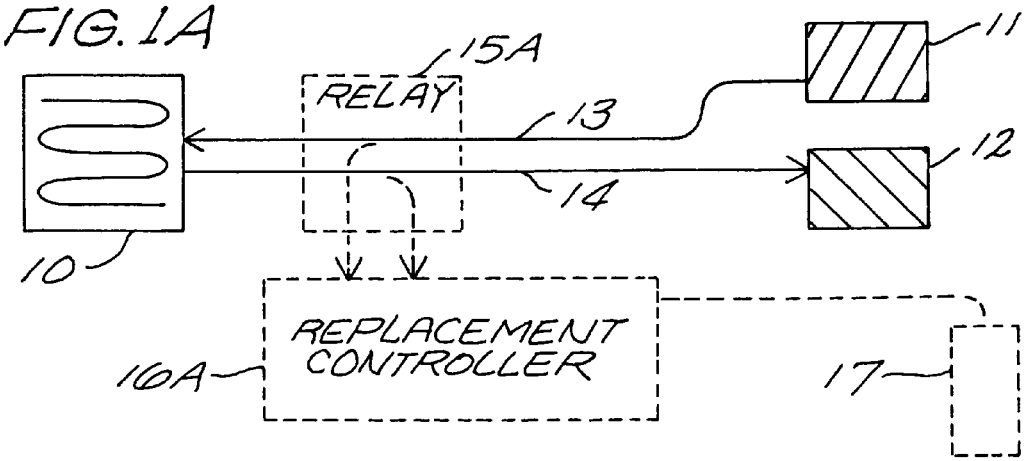
Figure 1B:
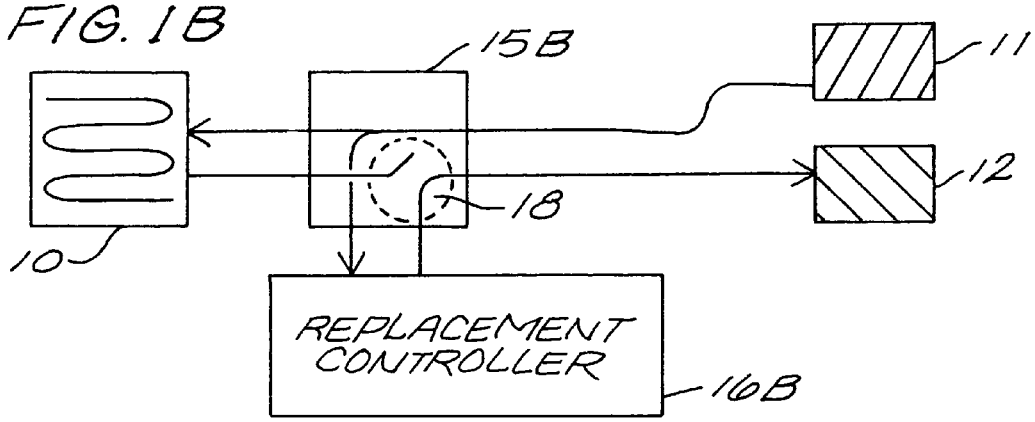
Figure 1C:
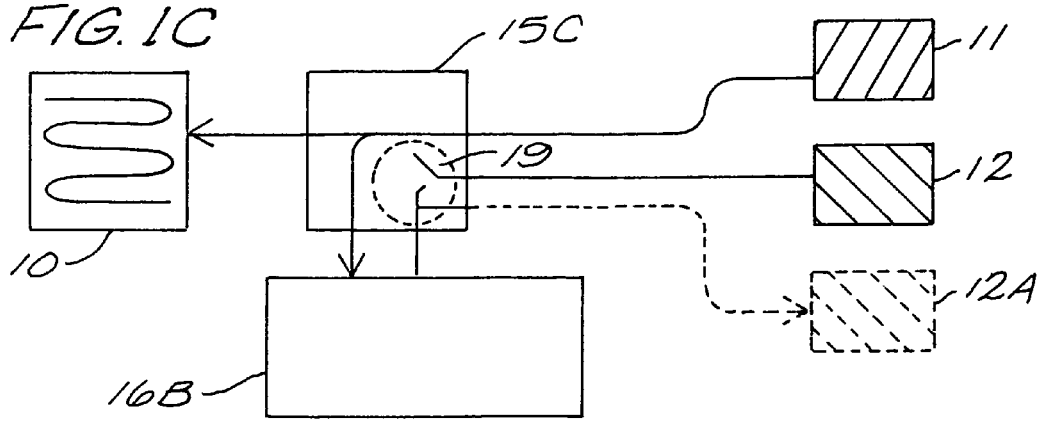

FIGS. 1A, 1B, and 1C illustrate in block form the invention being installed into an existing monitoring and control system.

Referring to FIG. 1A, the existing system consists of existing sensor 11 which is used to monitor a condition in the production facility. In the case of an oil refinery, sensor 11 may sense the temperature of the oil.

Sensor 11 communicates via channel 13, data indicative of the condition to existing controller 10. Existing controller 10 uses the data from sensor 11 to determine a response which is communicated via channel 14 to the existing operational mechanism 12. In the example above, an oil refinery, existing operational mechanism 12 may be a heater which is directed by existing controller 10 to reduce the heat being transferred into the oil so that the oil obtains a temperature within the desired range.

The first step for the present invention is the placement of a repeater/relay 15 to intercept the communications on channels 13 and 14. Once relay 15 is installed, the signals on these two channels 13 and 14, in the preliminary step, are passed along so that there is no interruption of the existing system's operation. Existing Controller 10, existing sensor 11, and existing operational mechanism 12 are unaware that relay 15 has been inserted into the system as all communications are performed as before.

Relay 15 communicates the signals on channels 13 and 14 to a replacement controller 16 which initially only monitors the signals on channels 13 and 14 without exerting any control operations. Replacement controller 16, in some embodiments, uses the signals from channels 13 and 14 to create a display on monitor 17 which better communicates the system's situation to an operator (not shown).

FIG. 1B illustrates the operation once it has been determined to place the replacement controller 16B on line.

Switch 18 within relay 15B, is opened to isolate existing controller 10 from the existing operational mechanism 12; switch 18 also connects the replacement controller 16B with the existing operational mechanism 12, thereby permitting the replacement controller 16B to receive the signals from existing sensor 11 and control operation of the existing operational mechanism 12.

Should replacement controller 16B not perform properly, reversion to the prior configuration using the still installed existing controller 10 is by reversing switch 18; thereby placing existing controller 10 on-line and the replacement controller 16B off-line. This configuration now provides a redundant system using the existing mechanisms which have been shown to be accurate and operational while certifying a yet-to-be-tested replacement controller 16B.

FIG. 1C illustrates the relations established when a new operational mechanism is inserted into the system. Although only the new operational mechanism is shown in this illustration, the same type of arrangement is used for a replacement sensor, as those of ordinary skill in the art readily recognize.

When replacement operational mechanism 12A has been installed, its operation is tested by activation of switch 19 within relay 15C. Switch 19 is used to isolate the existing operational mechanism 12 from replacement controller 16B while connecting replacement controller 16B with the replacement operational mechanism 12A.

Again, if there is a problem with replacement operational mechanism 12A, the existing operational mechanism 12 is easily "installed" by simply reversing the connections created by switch 19.

This type of arrangement permits the entire mechanism to be safely upgraded by using the existing system as the redundant backup operation.

Figure 2:
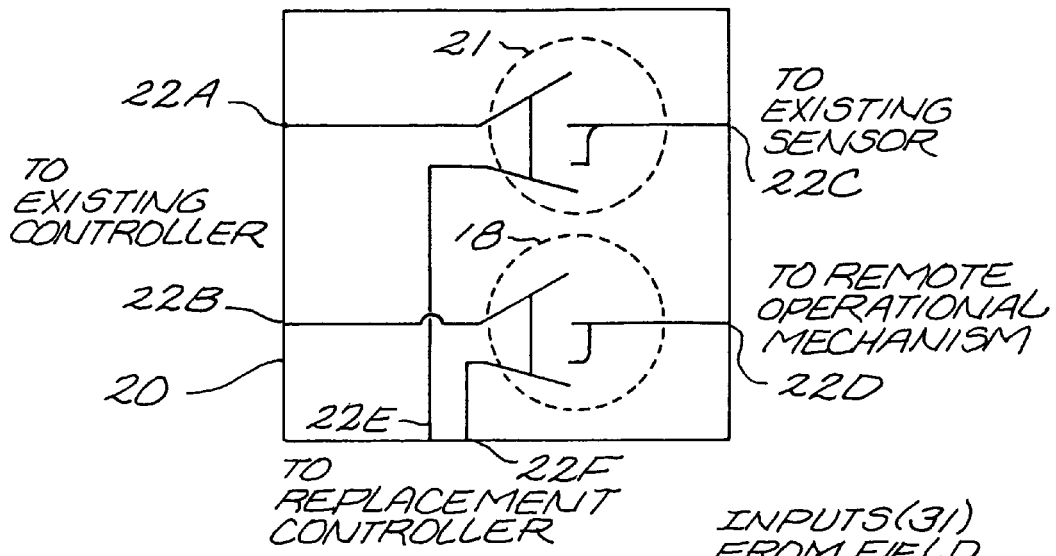
FIG. 2 is a switch diagram of the preferred relay.

FIG. 2 is a switch diagram of the preferred relay. Relay 20 is connected via connectors 22A and 22B to the existing controller (not shown), to the existing sensor via connector 22C, to the existing remote operational mechanism via connector 22D, and to the replacement controller via connectors 22E and 22F.

Switch 18 is configured to allow the existing controller to be selectively isolated from the existing operational mechanism while connecting the replacement controller to the remote operational mechanism.

Similarly, switch 21 is used to electively isolate the existing sensor.

Figure 3:
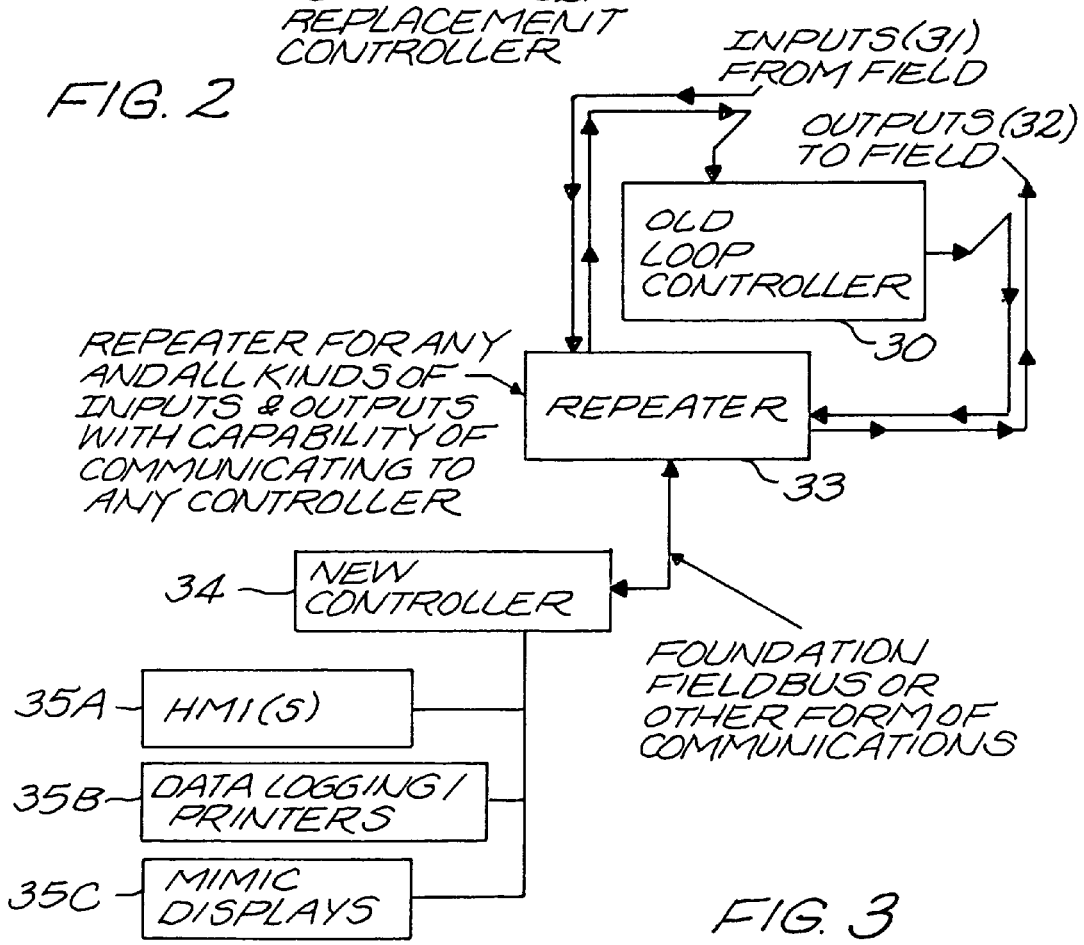
FIG. 3 is a block diagram of the completed preferred embodiment.

FIG. 3 is a block diagram of the preferred embodiment of the invention in completed form.

Repeater 33 is installed to receive the inputs from the field 31 and the pass the outputs to the field 32. Initially, repeater 33 communicates the inputs 31 to the old loop controller 30 and passes the operational signals from the old loop controller 30 the field 32.

Repeater 33 also interacts with the new controller 34 which is able to generate human-machine-interface 35A, keep records through the data logging printers 35B, and create displays 35C.

At a time chosen by the operators, repeater 33 is able to isolate the old loop controller 30 and place new controller 34 on-line without the costs or potential risks currently experienced.

It is clear that the present invention creates a mechanism which permits a safe upgrade and which eliminates or minimizes the risks of failure to the system.

What is claimed is:

1. An upgrade mechanism for an existing control system having an existing controller reacting to data from a remote sensor and directing operation of an existing remote operational mechanism, said upgrade mechanism comprising, a relay mechanism being interposed between the existing remote sensor and the existing controller, and between the existing controller and the remote operational mechanism, said relay mechanism, in response to operator input, selectively,
   a) transmitting,
      1) data from the remote sensor to the existing controller, and,
      2) control signals from the existing controller to the existing remote operational mechanism; or,
   b) isolating said existing controller from the remote operational mechanism; and,
   further including a replacement controller having a memory containing operational data established by data from the existing remote sensor and the control signals via the relay mechanism, said operational data defining operation of the replacement controller.

2. The upgrade mechanism according to claim 1, further including a replacement control mechanism, said replacement control mechanism receiving control signals from said relay mechanism; and, wherein said relay includes selective isolation of the existing remote operational mechanism.

3. An upgrade mechanism for an existing control system having an existing controller reacting to data from a remote sensor and directing operation of an existing remote operational mechanism using control signals, said upgrade mechanism comprising,
   a) a relay mechanism being interposed between the existing remote sensor and the existing controller, and between the existing controller and the existing remote operational mechanism, said relay mechanism transmitting,
      1) data from the remote sensor to the existing controller, and,
      2) control signals from the existing controller to the remote operational mechanism; and,
   b) a replacement controller having a memory containing operational data defined by said data from the remote sensor and the control signals from the relay mechanism.

4. The upgrade mechanism according to claim 3, further including a first switch for,
   a) isolating said existing controller from said remote operational mechanism, and,
   b) transmitting replacement control signals from the replacement controller to the existing remote operational mechanism.

5. The upgrade mechanism according to claim 4, wherein, when said first switch is contained within said relay mechanism.

6. The upgrade mechanism according to claim 5, wherein said relay mechanism and the replacement controller are contained within the same housing.

7. The upgrade mechanism according to claim 5, wherein said replacement controller contains a memory containing operational data defining operation of the replacement controller.

8. The upgrade mechanism according to claim 7, wherein said operational data is established by the data from the existing remote sensor and the control signals from the relay mechanism.

9. The upgrade mechanism according to claim 8, further including:
   a) a replacement control mechanism, said replacement control mechanism receiving control signals from said relay mechanism; and,
   b) a second switch for isolating said existing control mechanism from operation.

10. An upgrade mechanism for an existing control system for a processing mechanism using an existing controller reacting to data from an existing remote sensor monitoring a selected condition within the processing mechanism and directing operation of an existing remote operational mechanism which defines operation of a component of the processing mechanism, said upgrade mechanism including a relay mechanism being interposed between the existing remote sensor and the existing controller, and between the existing controller and the existing remote operational mechanism, said relay mechanism transmitting sensor signals from the existing remote sensor to the existing controller, and, control signals from the existing controller to the existing remote operational mechanism, and further including:
   a) a replacement control mechanism, said replacement control mechanism receiving control signals from said relay mechanism; and,
   b) a second switch for isolating said existing control mechanism from operation.

11. The upgrade mechanism according to claim 10, further including a replacement controller having a memory, said replacement controller configured to:
   a) receive data from the existing remote sensor and the control signals via the said relay mechanism;
   b) form an operational parameter data base from said data and the control signals; and,
   c) store said operational parameter data base in said memory.

12. The upgrade mechanism according to claim 11,
   a) further including a first switch for isolating said existing controller from the remote operational mechanism; and,
   b) when said first switch is activated, said replacement controller generates a replacement control signal transmitted via said relay mechanism to the remote operational mechanism.

* * * * *